United States Patent [19]
Specht et al.
[11] 4,319,183
[45] Mar. 9, 1982

[54] CONTROL WINDINGS FOR SELF-SATURATING ELECTRICAL REACTORS

[75] Inventors: Theodore R. Specht; Robert D. Morris, both of Sharon, Pa.
[73] Assignee: Westinghouse Electric Corp., Pittsburgh, Pa.

[21] Appl. No.: 186,367
[22] Filed: Sep. 12, 1980
[51] Int. Cl.³ ......................... G05F 7/00; H02P 13/24
[52] U.S. Cl. ....................................... 323/337; 361/93
[58] Field of Search ............... 323/251, 253, 332, 335, 323/337; 363/90-93, 126

[56] References Cited

U.S. PATENT DOCUMENTS 2,516,563 5/1950 Graves .
2,752,551 6/1956 Bixby .
2,774,930 12/1956 Bixby .
2,955,243 10/1960 Lyons et al. .................... 323/335 X
3,037,159 5/1962 Brown .
3,040,233 6/1962 Bixby ............................. 323/251 X
3,137,823 6/1964 Cioccio et al. .
3,157,836 11/1964 Jarvinen .
3,183,429 5/1965 Baycura et al. .................. 363/91 X
3,221,280 11/1965 Malsbary et al. .
3,247,442 4/1966 Medlar .
3,315,151 4/1967 Wentworth ......................... 323/335
3,353,093 11/1967 Peterson .
3,436,692 4/1969 Walters .

*Primary Examiner*—William M. Shoop
*Attorney, Agent, or Firm*—D. R. Lackey

[57] ABSTRACT

A self-saturating electrical reactor has a magnetic core located within a casing. A gate winding has at least one turn on the magnetic core and is accessible from outside of the casing. A bundled conductor containing a plurality of individual conductors has at least one turn on the magnetic core. The individual conductors form a plurality of single turn windings which are accessible from outside of the casing such that the configuration of the D.C. control and bias windings is determinable by the field wiring.

8 Claims, 5 Drawing Figures

CONTROL WINDINGS FOR SELF-SATURATING ELECTRICAL REACTORS

BACKGROUND OF THE INVENTION

1. Field of the Invention

The present invention is related generally to electrical reactors and more specifically to control windings of self-saturating electrical reactors.

2. Description of the Prior Art

Self-saturating electrical reactors have been widely produced, and the physical and electrical characteristics of these reactors are well known. Such reactors generally consist of a lamination formed by a stack of metal sheets. Each metal sheet in the lamination is of an integral construction and has openings defined therein. The stacking of the metal sheets with the openings aligned produces a lamination having a plurality of reactor legs.

Direct current bias and control windings and gate windings carrying pulsating direct current are wound about the reactor legs. The gate windings are generally connected such that no net resultant A.C. voltage of fundamental frequency will be induced in the adjacent D.C. windings. Various lamination designs and winding configurations can be achieved depending upon the performance characteristics desired.

The finished reactor shipped by a manufacturer may be enclosed in a metal shell or casing. Lead wires accessible from outside of the casing are connected to the various windings. The gate and D.C. windings may be wired in the field by connection of the appropriate leads. If the gate winding is one turn, a through bar may be installed in the field. The D.C. bias and control windings are usually supplied by the manufacturer if there are several turns per winding.

When the D.C. windings of more than one reactor are to be connected to a single D.C. power source the windings are connected in series. This may result in high transient voltages appearing across the D.C. windings when the circuit is initially energized, and moderately high voltages during normal operation.

SUMMARY OF THE INVENTION

The present invention is a self-saturating electrical reactor having at least one magnetic core enclosed in a casing. A gate winding has at least one turn on the magnetic core and is accessible from outside the casing. A bundled conductor composed of a plurality of individual conductors has at least one turn on the magnetic core. The bundled conductor is accessible from outside the casing. EAch individual conductor within the bundled conductor is a one-turn winding which is accessible from outside of the casing for field wiring. Personnel in the field may thus control the configuration of the D.C. windings by various connections of the conductors within the bundled conductor.

When the D.C. windings of more than one reactor are to be connected to a single D.C. power source the individual conductors of the first reactor can be connected to the individual conductors of the second reactor to produce one winding wound about both cores. This is an advantage over the prior art wherein the two individual D.C. windings would have to be connected in series. Because the present invention enables two reactors to have one D.C. winding wound about both reactor cores, induced voltages and voltage transients in the D.C. winding are greatly reduced, thus allowing attendant reductions in the required insulation.

DESCRIPTION OF THE PREFERRED EMBODIMENT

Figure 1:
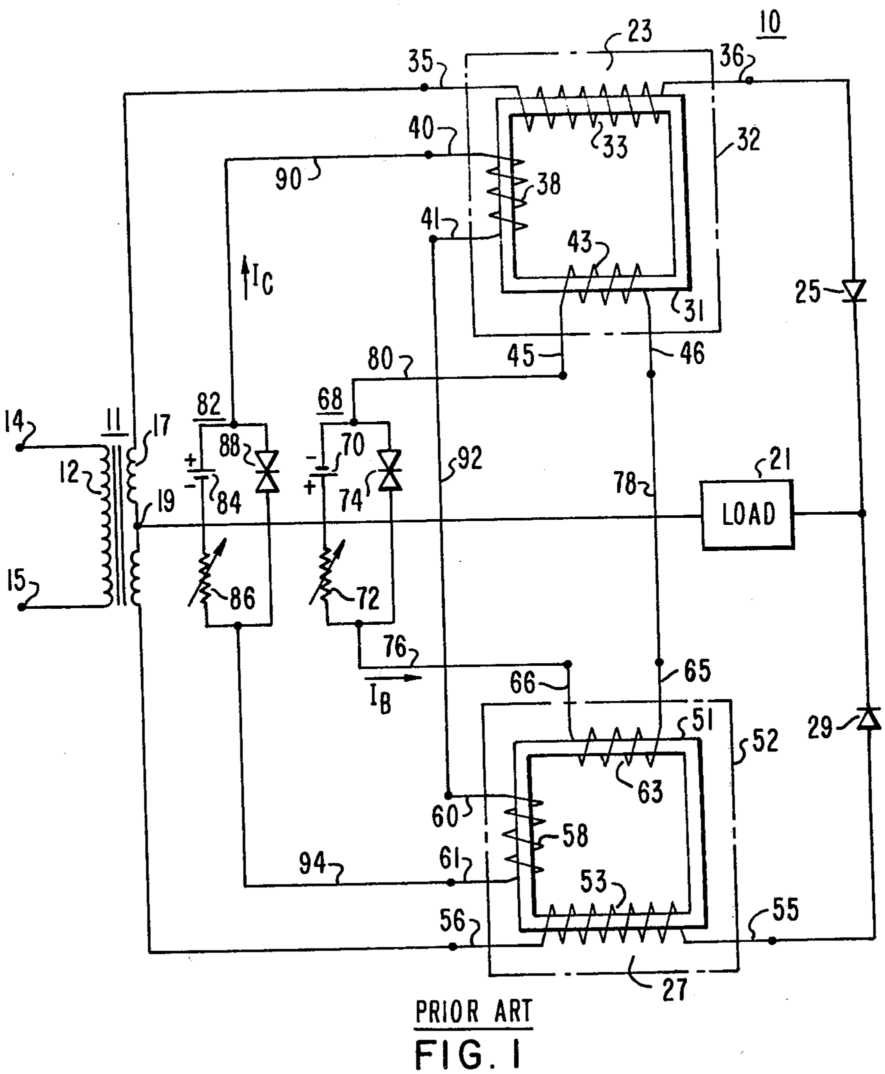
PRIOR ART FIG. 1
FIG. 1 is an electrical schematic illustrating the connection of two prior art self-saturating reactors in a single-phase full wave rectifier.

Referring to FIG. 1 a typical use for a self-saturating electrical reactor is shown. FIG. 1 illustrates a single-phase full wave power rectifier 10. An A.C. transformer 11 has a primary winding 12 connectable at input terminals 14 and 15 to an A.C. voltage source (not shown). The transformer 11 has a secondary winding 17 having a center tap 19. The center tap 19 is connected to a load 21. A first end of the secondary winding 17 is connected to the load 21 through the series combination of a first prior art self-saturating reactor 23 and a first rectifier 25. A second end of the secondary winding 17 is connected to the load 21 through the series combination of a second prior art self-saturating reactor 27 and a second rectifier 29.

The first prior art self-saturating reactor 23 has a magnetic core 31 enclosed in a metal casing 32. A gate winding 33 has a plurality of turns on the core 31 and is accessible from outside of the casing 32 by means of lead wires 35 and 36. The first reactor 23 has a D.C. control winding 38 and a D.C. bias winding 43 each having a plurality of turns on the core 31. The D.C. control winding 38 and the D.C. bias winding 43 are accessible from outside the casing 32 by means of lead wires 40, 41, 45 and 46, respectively.

The second prior art self-saturating reactor 27 is identical to the first prior art self-saturating reactor 23, having a magnetic core 51 enclosed in a metal casing 52. The reactor 27 has a gate winding 53 having leads 55 and 56, a D.C. control winding 58 having leads 60 and 61, and a D.C. bias winding 63 having leads 65 and 66.

A single D.C. power source 68 is used to provide a bias current $I_B$ to both the D.C. bias windings 43 and 63 of the reactors 23 and 27, respectively. The D.C. power source 68 is comprised of a battery 70 series connected with an adjustable resistor 72. An over-voltage protector 74, such as a Westinghouse VOLTRAP protector, is connected in parallel with the series combination. The parallel combination is connected at one end by a conductor 76 to the lead wire 66 of the bias winding 63. The lead wire 65 of the bias winding 63 is connected to the lead wire 46 of the bias winding 43 by a conductor 78. The lead wire 45 of the bias winding 43 is connected to the other end of the parallel combination by a conductor 80. In this manner the bias windings 43 and 63 are connected in series.

The bias current $I_B$ is fixed at a predetermined value by adjustment of the adjustable resistor 72. The bias current $I_B$ flows through the series connected bias windings 63 and 43 producing a magnetic flux for saturating the cores 51 and 31, respectively. The over-voltage protector 74 limits the voltage across the series combination of the battery 70 and the adjustable resistor 72. The over-voltage protector 74 acts as an open circuit below a predetermined voltage and acts as a short circuit above the predetermined voltage. Thus, if a voltage is induced in either of the bias windings 43 or 63 such that the voltage across both bias windings 43 and 63 is greater than the predetermined voltage, the over-voltage protector 74 will become conductive limiting the voltage across the series combination of the battery 70 and the adjustable resistor 72.

A single D.C. power source 82 is used to provide a control current $I_C$ to both the D.C. control windings 38 and 58 of the reactors 23 and 27, respectively. The D.C. power source 82 is comprised of a battery 84 series connected with an adjustable resistor 86. An over-voltage protector 88, such as a Westinghouse VOLTRAP protector, is connected in parallel with the series combination. One end of the parallel combination is connected to the lead wire 40 of the control winding 38 by a conductor 90. The lead wire 41 of the control winding 38 is connected to the lead wire 60 of the control winding 58 by a conductor 92. The lead wire 61 of the control winding 58 is connected to the other end of the parallel combination by a conductor 94. In this way the control windings 38 and 58 are connected in series. The control current $I_C$ is varied by varying the adjustable resistor 86. The control current flows through the control windings 38 and 58 producing a magnetic flux in opposition to the magnetic flux produced by the bias windings 43 and 63, respectively. The control current $I_C$ is used to control the degree of saturation of the cores 31 and 51. The over-voltage protector 88 is identical to the over-voltage protector 74 and provides a similar function.

Figure 2:
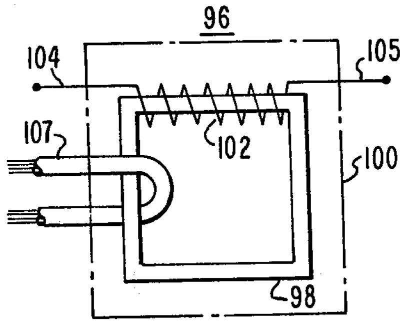
FIG. 2 illustrates a self-saturating reactor constructed according to the teachings of the present invention.

Turning now to FIG. 2 a self-saturating electrical reactor 96 constructed in accordance with the teachings of the present invention is illustrated. The reactor 96 has a magnetic core 98 located within a shell or casing 100. A gate winding 102 has a plurality of turns on the core 98 and is accessible from outside the casing 100 by means of lead wires 104 and 105. A bundled conductor 107 comprised of a plurality of individual conductors has at least one turn on the magnetic core. Each of the individual conductors of the bundled conductor 107 is accessible from outside of the casing 100. The bundled conductor 107 is used in place of the D.C. bias and control windings found in prior art self-saturating reactors. The bundled conductor 107 typically contains approximately 20 individual conductors. Since each individual conductor is accessible from outside the casing 100 there are 20 single turn windings available for use as control and bias windings.

Figure 3:
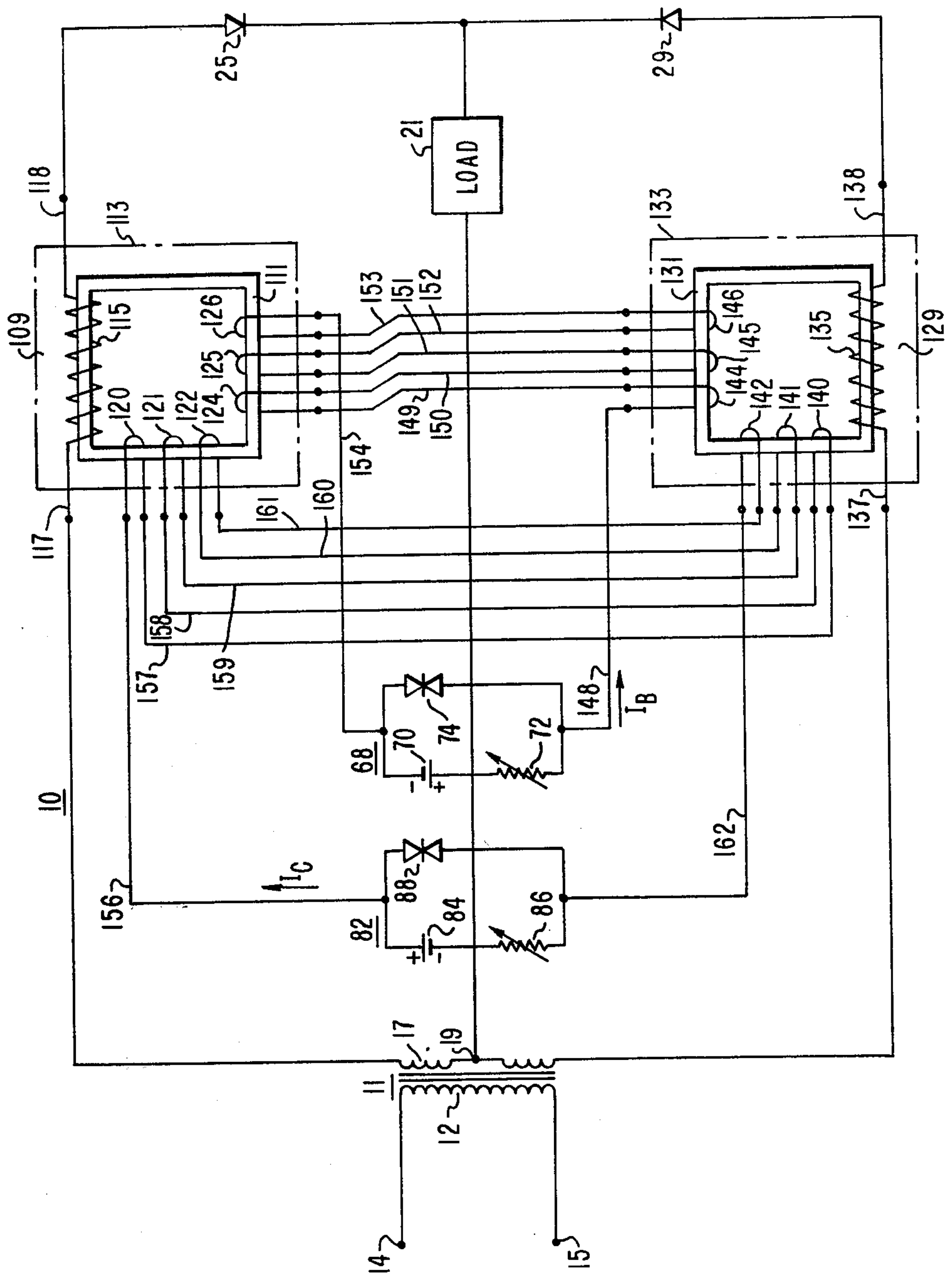
FIG. 3 is an electrical schematic illustrating the connection of two self-saturating reactors constructed according to the teachings of the present invention in a single-phase full wave rectifier.

FIG. 3 illustrates the single phase full wave rectifier 10 of FIG. 1 utilizing self-saturating reactors constructed in accordance with the teachings of this invention. The same reference numerals are used where identical components are providing identical functions. One end of the secondary winding 17 is connected to the load 21 through the series combination of a first self-saturating reactor 109 constructed in accordance with the teachings of this invention and the first rectifier 25. The first self-saturating reactor 109 has a magnetic core 111 enclosed in a metal casing 113. A gate winding 115 has a plurality of turns on the core 111 and is accessible from outside the casing 113 by means of lead wires 117 and 118. The reactor 109 has a bundled conductor (not shown) which has a single turn on the core 111. Each of the individual conductors within the bundled conductor forms a single turn winding. The reactor 109 has three one turn control windings 120, 121 and 122 and three on turn bias windings 124, 125 and 126. The remaining individual conductors (if any) within the bundled conductor are not used and not shown.

The other end of the secondary winding 17 is connected to the load 21 through the series combination of a second self-saturating reactor 129 constructed in accordance with the teachings of this invention and the second rectifier 29. The reactor 129 has a magnetic core 131 enclosed in a metal casing 133. A gate winding 135 has a plurality of turns on the core 131 and is accessible from outside the casing 133 by means of lead wires 137 and 138. The reactor 129 has a bundled conductor (not shown) which has a single turn on the core 131. The individual conductors within the bundled conductor each form a single turn winding. The reactor 129 has three one turn control windings 140, 141 and 142 and three on turn bias windings 144, 145 and 146. The remaining individual conductors (if any) are not used and not shown.

The single D.C. power source 68 is used to provide the bias current $I_B$ to the three bias windings 124, 125, and 126 of the reactor 109 and the three bias windings 144, 145 and 146 of the reactor 129. One end of the parallel combination of the D.C. power source 68 is connected to the winding 144 by a conductor 148. The windings 144, 124, 145, 125, 146, and 126 are serially connected by conductors 149 through 153, respectively. The winding 126 is connected to the other end of the parallel combination of the D.C. power source 68 by a conductor 154. In this manner one bias winding is wound on both cores 111 and 131. The bias current $I_B$ flows through the bias windings of the reactors 109 and 129 producing a magnetic flux for saturating the reactor cores 111 and 131, respectively.

The single D.C. power source 82 is used to provide the control current $I_C$ to the control windings 120, 121 and 122 of the reactor 109 and the control windings 140, 141 and 142 of the reactor 129. One end of the parallel combination of the D.C. power source 82 is connected to the winding 120 by a conductor 156. The windings 120, 140, 121, 141, 122, and 142 are serially connected by conductors 157 through 161, respectively. The winding 142 is connected to the other end of the parallel combination of the D.C. power source 82 by a conductor 162. In this manner one control winding is wound on both cores 111 and 131. The control current $I_C$ flows through the control windings of the reactors 109 and 129 producing a magnetic flux opposing the magnetic flux produced by the bias windings thus controlling the degree of saturation of the cores 111 and 131, respectively.

Figure 4:
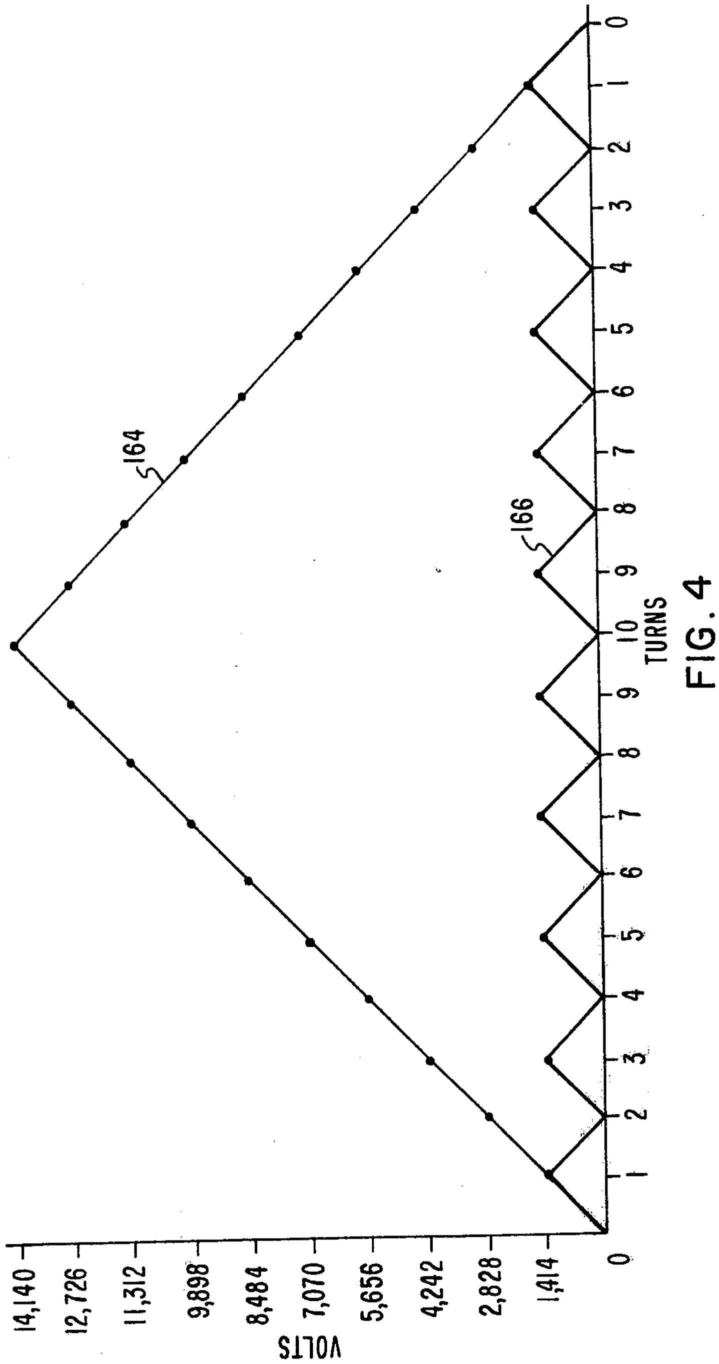
FIG. 4 illustrates a plot of the voltage potential of the control windings of the rectifiers of FIGS. 1 and 3 as a function of the field wiring.

The advantages of the wiring scheme of FIG. 3, wherein a single control and a single bias winding each has a plurality of turns wound about both cores, over the wiring scheme of FIG. 1, wherein two control windings and two bias windings each have a plurality of turns on separate cores and are series connected, are dramatically illustrated in FIG. 4. FIG. 4 illustrates a plot of the voltage potential of the control windings as a function of field wiring measured in the number of turns from the D.C. power source 82. Assuming the transformer 11 is 1,000 volts line to neutral and that the reactors 23 and 27 each have a one turn gate winding and a ten turn control winding, a crest voltage $V_C$ is calculated by multiplying the voltage across the A.C. main winding ($\sqrt{2}\times 1000$) by the ratio (10:1) of the number of turns of the control winding to the number of turns of the gate winding. This provides a crest voltage $V_C$ of 14,140 volts. This means that in the wiring scheme of FIG. 1 the A.C. voltage on the secondary side of the transformer 11 may at times be transformed by the turns ratio from the gate winding to the control and bias windings.

The curve 164 shown in FIG. 4 illustrates the voltage potential of the control windings 38 and 58 of the wiring scheme of FIG. 1. Beginning at one end of the parallel combination of the D.C. power source 82, and moving in the direction in which the current $I_C$ flows, a voltage of 1,414 volts is induced across the first turn of the D.C. control winding 38. Each of the ten turns of the winding 38 experiences 1,414 volts which add together to subject the winding 38 to a total of 14,140 volts. Continuing on to the turns of the control winding 58, the turns of the control winding 58 are subjected to an equal and opposite magnetic flux such that a negative 1,414 volts is induced across each turn of the winding. 14,140 volts are induced across the entire winding 58 such that the voltage potential across both of the control windings is returned to zero upon returning to the D.C. power source 82.

The curve 164 is to be contrasted with a curve 166 which illustrates the voltage potential of the control windings of the wiring scheme of FIG. 3. Beginning at one end of the parallel combination of the D.C. power source 82, the first D.C. control winding 120 is subjected to 1,414 volts. The next winding is the D.C. control winding 140 which is subjected to a negative 1,414 volts returning the voltage potential across both of the control windings to zero. Since the control windings of the reactor 109 are alternately connected with the control windings of the reactor 129 the voltage potential across both of the control windings never exceeds 1,414 volts. This results in a large reduction in the amount of insulation required.

The above discussion, made in conjunction with the control windings, is also true for the bias windings. However, since the bias current $I_B$ flows in a direction opposite to the control current $I_C$ the polarity of the cirves 164 and 166 is reversed. When initially energizing the power rectifier 10 of FIG. 1 from the A.C. power source, one of the cores 31 or 51 may become saturated. Under this condition the high voltage which may appear across the D.C. windings of either core 31 or 51 appears directly across the over-voltage protectors 74 and 88. The resistance of the over-voltage protectors drops to a low value along with the voltage across the D.C. windings and the voltage between turns. Essentially, the voltage is absorbed by the leakage flux produced between the gate winding and the D.C. windings.

In FIG. 3 the connections between the bundled conductor (not shown) of the reactor 109 and the bundled conductor (not shown) of the reactor 129 are shown. FIG. 3 is illustrative of the situation wherein each reactor has its own casing. However, there are situations wherein the present invention may be utilized even though all the cores are within the same casing and all the D.C. windings may not be accessible from outside the casing. Such a situation is illustrated in FIG. 5.

Figure 5:
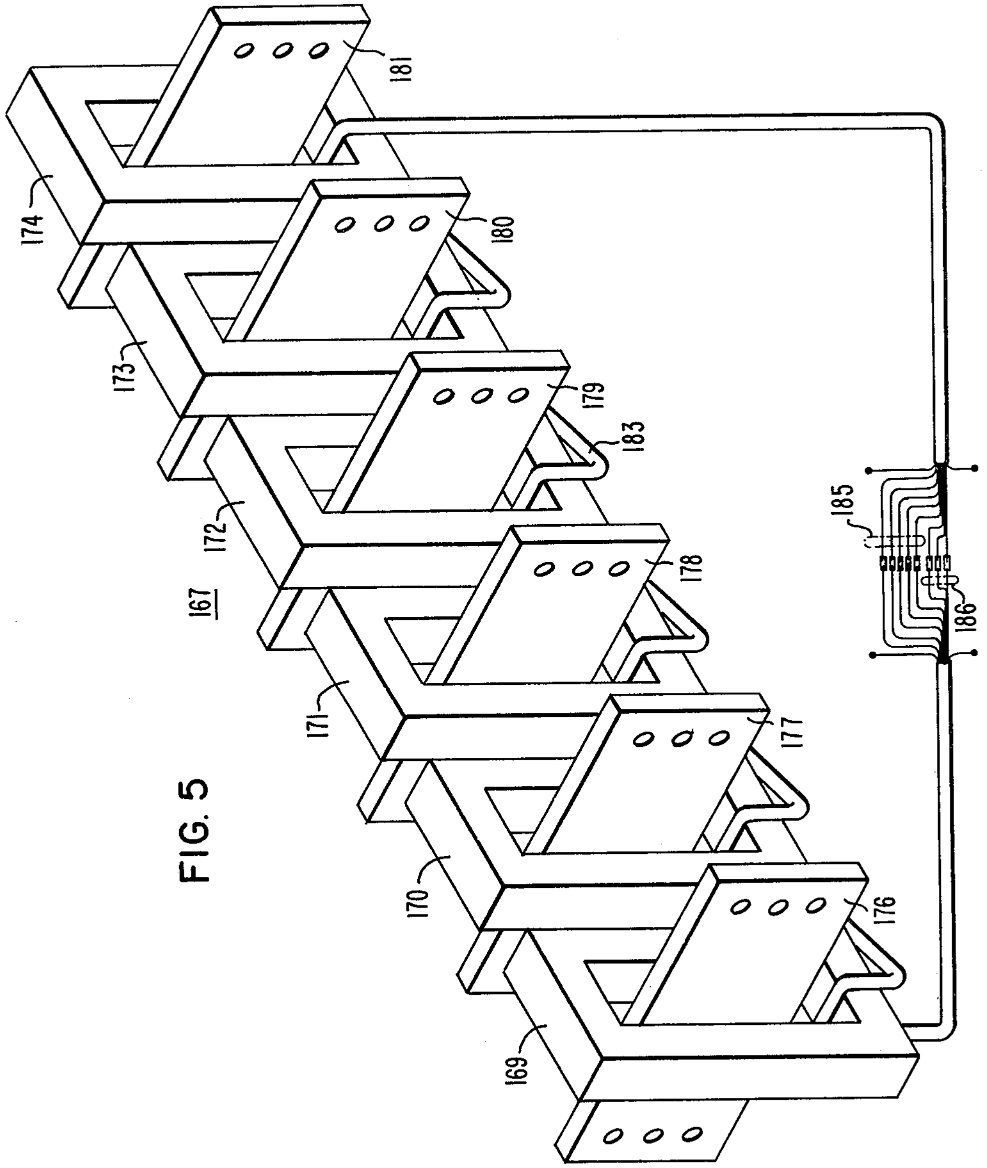
FIG. 5 illustrates the six cores of a six phase, double wye rectifier utiizing the present invention.

FIG. 5 shows six cores 169 through 174, inclusive, of a six phase, double wye rectifier 167. Each of the cores 169–174 has a cooper bar 176 through 181, respectively, extending therethrough which provides a single turn gate winding. As can be seen from FIG. 5 the cores 169–174 are oriented such that their central openings are non-linearly positioned with respect to each other. A bundled conductor 183 has one turn on each of the cores 169–174. A plurality of individual conductors 185 within the bundled conductor 183 are connected so as to provide a single control winding for connection to a D.C. power supply (not shown); a plurality of individual conductors 186 are connected so as to provide a single bias winding for connection to a D.C. power supply (not shown). In this manner a single control and a single bias winding each has a plurality of turns on all the cores thus providing the above-described advantages.

Finally, the vehicles used to describe the present invention, i.e., the rectifiers 10 and 167, have been used for purposes of illustration and are not intended to be limitations. It is to be understood that the advantages ascribed to the present invention may be realized in other applications.

What is claimed is:

1. A self-saturating electrical reactor for use in a power transmission and distribution system, comprising:

a casing;

a magnetic core located within said casing;

a gate winding having at least one turn on said magnetic core, said gate winding being accessible from outside of said casing for connection to the power system;

a plurality of DC windings having at least one turn on said magnetic core, said DC windings being accessible from outside of said casing enabling their external connection to determine the configuration of said DC windings;

and means bundling said plurality of at least one turn DC windings providing a single bundled conductor having at least one turn on said magnetic core.

2. The electrical reactor of claim 1 including at least one additional magnetic core, and wherein the plurality of D.C. windings has at least one turn on said additional magnetic core.

3. The electrical reactor of claim 1 wherein at least one of the one turn DC windings is adapted for connection to means for producing a D.C. bias current such that a magnetic flux is produced for saturating the magnetic core.

4. The electrical reactor as claimed in claim 1 including means for producing a D.C. bias current connected to at least one of the one turn D.C. windings, said means including a battery in series with an adjustable resistor, and an over-voltage protector in parallel with said series combination.

5. The electrical reactor as claimed in claim 3 wherein at least another of the one turn D.C. windings is adapted for connection to means for producing a D.C. control current such that a magnetic flux is produced in opposition to the magnetic flux produced for saturating the magnetic core, whereby the degree of saturation is controllable.

6. The electrical reactor as claimed in claim 1 including means for producing a D.C. control current connected to at least one of the one turn D.C. windings, said means including a battery in series with an adjustable resistor, and an over-voltage protector in parallel with said series combination.

7. A self-saturating electrical reactor for use in a power transmission and distribution system, comprising:

a casing;

a plurality of magnetic cores located within said casing, said cores having an opening adapted for receiving D.C. windings, said cores oriented within the casing such that said openings are non-linearly positioned with respect to each other;

a plurality of gate windings having at least one turn on said magnetic core, said gate windings being accessible from outside of said casing for connection to the power system;

and a bundled conductor having at least one turn on said magnetic cores, said bundled conductor passing through said openings providing a plurality of single turn D.C. windings wound about all of said cores.

8. A self-saturating electrical reactor for use in a power transmission and distribution system, comprising:

a casing;

a magnetic core located within said casing;

a gate winding having at least one turn on said magnetic core, said gate winding being accessible from outside of said casing for connection to the power system;

means providing an adjustable D.C. bias current;

means providing an adjustable D.C. control current;

and a bundled conductor having at least one turn on said magnetic core, said bundled conductor including a plurality of individual conductors, said individual conductors forming a plurality of at least one turn DC windings, said individual conductors being accessible from outside of said casing enabling their external connection to determine the configuration of said D.C. windings, at least one of said individual conductors being connected to said means providing said bias current such that a magnetic flux is produced for saturating said magnetic core, and at least another of said individual conductors being connected to said means providing said control current such that a magnetic flux is produced in opposition to said magnetic flux produced for saturating said magnetic core, whereby the degree of saturation is controllable.

* * * * *